(12) United States Patent
Ito (10) Patent No.: US 8,452,895 B2
(45) Date of Patent: May 28, 2013

(54) COMMUNICATION METHOD AND TERMINAL APPARATUSES USING THE COMMUNICATION METHOD IN AN AD-HOC NETWORK

(75) Inventor: Kiyoshige Ito, Gifu (JP)

(73) Assignee: Hera Wireless S.A., Luxembourg (LU)

( * ) Notice: Subject to any disclaimer, the term of this patent is extended or adjusted under 35 U.S.C. 154(b) by 225 days.

(21) Appl. No.: 13/120,133

(22) PCT Filed: Aug. 26, 2009

(86) PCT No.: PCT/JP2009/004146
§ 371 (c)(1),
(2), (4) Date: May 3, 2011

(87) PCT Pub. No.: WO2010/032382
PCT Pub. Date: Mar. 25, 2010

(65) Prior Publication Data
US 2011/0208846 A1    Aug. 25, 2011

(30) Foreign Application Priority Data

Sep. 19, 2008  (JP) ................................ 2008-240824

(51) Int. Cl.
*G06F 15/16* (2006.01)
*H04L 12/28* (2006.01)

(52) U.S. Cl.
USPC ........... 709/245; 709/225; 709/228; 370/254; 370/349; 370/471

(58) Field of Classification Search
USPC ........................................................ 370/237
See application file for complete search history.

(56) References Cited

U.S. PATENT DOCUMENTS

2003/0140283 A1* 7/2003 Nishio ............................. 714/43
2003/0179750 A1* 9/2003 Hasty et al. .................... 370/390
(Continued)

FOREIGN PATENT DOCUMENTS

JP   2003-273873   9/2003
JP   2004-007351   1/2004
(Continued)

OTHER PUBLICATIONS

International Search Report issued in International Patent Application No. PCT/JP2009/004146 dated Sep. 29, 2009.

(Continued)

*Primary Examiner* — Ian N Moore
*Assistant Examiner* — Eric P Smith
(74) *Attorney, Agent, or Firm* — DC Patent Lawyers, PLLC (57) ABSTRACT

A control unit assigns an IP address to a new terminal apparatus which has approved of the participation. When a server, to which an IP address is assignable, is contained in the ad-hoc network, the control unit instructs the new terminal apparatus to access the server. When the server, to which an IP address is assignable, is not contained in the ad-hoc network and when the new terminal apparatus is capable of assigning an IP address on its own, the control unit instructs the new terminal apparatus to assign an IP address. When the server, to which an IP address is assignable, is not contained in the ad-hoc network and when the new terminal apparatus is not capable of assigning an IP address on its own, the control unit assigns an IP address to the new terminal apparatus.

3 Claims, 6 Drawing Sheets

U.S. PATENT DOCUMENTS

| | | | |
|---|---|---|---|
| 2004/0120268 A1* | 6/2004 | Lobbert | 370/254 |
| 2006/0146746 A1* | 7/2006 | Kim | 370/328 |
| 2006/0291434 A1* | 12/2006 | Gu et al. | 370/338 |
| 2007/0002833 A1* | 1/2007 | Bajic | 370/352 |

FOREIGN PATENT DOCUMENTS

| | | |
|---|---|---|
| JP | 2005-348337 | 12/2005 |
| JP | 2007-006190 | 1/2007 |
| JP | 2007-082070 | 3/2007 |

OTHER PUBLICATIONS

Transmittal of International Preliminary Report on Patentability issued in International Patent Application No. PCT/JP2009/004146 dated Mar. 31, 2011.

K. Mase et al., "Ad Hoc Networks," Journal of Institute of Electronics, Information, and Communication Engineers (IEICE), IEICE, pp. 127-134, vol. 84, No. 2, Feb. 2001, w/ English translation thereof.

* cited by examiner

| NAME OF APPARATUS | DHCP | Auto-IP | IP ADDRESS | MAC ADDRESS |
|---|---|---|---|---|
| A1 | × | × | B1 | C1 |
| A2 | ○ | × | B2 | C2 |
| A3 | × | ○ | B3 | C3 |
| | | | | |
| | | | | |
| AM | × | × | BM | CM |

COMMUNICATION METHOD AND TERMINAL APPARATUSES USING THE COMMUNICATION METHOD IN AN AD-HOC NETWORK

RELATED APPLICATIONS

This application is the U.S. National Phase under 35 U.S.C. §371 of International Application No. PCT/JP2009/004146, filed on Aug. 26, 2009, which in turn claims the benefit of Japanese Application No. 2008-240824, filed on Sep. 19, 2008, the disclosures of which Applications are incorporated by reference herein.

TECHNICAL FIELD

The present invention relates to a communication technology, and it particularly relates to a communication method and terminal apparatuses using said method in an ad-hoc network.

BACKGROUND TECHNOLOGY

An ad-hoc network, which is constituted by terminal apparatuses, is an independent distributed network without relying on any base station apparatus or wired network. In the ad-hoc network, each of the terminal apparatuses is given an equal role and function, and the terminal apparatuses exchange information with each other through multi-hop routing. Such routing methods in the ad-hoc network include a table-driven method, an on-demand method, and a hybrid method. In the table-driven method, each terminal apparatus maintains a routing table that associates the final destination of a packet signal with next-hop destinations thereof. Also, each terminal apparatus determines a next-hop destination from the destination of a packet signal by referencing the routing table. Examples of the table-driven method are DSDV (Destination Sequence Distance Vector), WRP (Wireless Routing Protocol), CGSR (Clusterhead Gateway Switch Routing), and OLSR (Optimized Link State Routing).

In the on-demand method, a terminal apparatus, which generates source information, finds a route through which to arrive at a target terminal apparatus, when it requests a transfer of the packet signal. The terminal apparatus generating the source information first transfers the packet signal used for the inquiry, by flooding the packet signal. Thereby, a reverse-direction route toward the source-information generating terminal apparatus is learned. At the same time, the source-information generating terminal apparatus also replies to the target terminal apparatus that has received the packet signal used for the inquiry. Based on the route found as above, the packet signal is transferred from the source-information generating terminal apparatus to the target terminal apparatus. Examples of the on-demand method are AODV (Ad hoc On demand Distance Vector), DSR (Dynamic Source Routing), TORA (Temporally Ordered Routing Algorithm), RDMAR (Relative Distance Micro-discovery Ad hoc Routing protocol), and ABR (Associativity-Based Routing). The hybrid method is a method combining the table-driven method and the on-demand method (See Non-patent Document 1, for instance).

In the ad-hoc network, a technique is suggested which simplifies the setting of terminal apparatuses. A predetermined terminal apparatus holds communication setting information, and a tag is held closely over an IC card reader/writer mounted to this terminal apparatus. As a result, the IC card reader/writer communicates with the tag through a noncontact communication and thereby transmits the communication setting information. Also, a procedure reverse to that described above is performed between the tag and an IC card reader/writer mounted on another terminal apparatus and thereby the communication setting information is transmitted to the another terminal apparatus (See Patent Document 1, for instance).

PRIOR ART DOCUMENTS

Non-Patent Documents

[Non-patent Document 1]
Kenichi MASE, Keisuke NAKANO, Masagazu SENGOKU and Shoji SHINODA, "Ad Hoc Networks", Journal of Institute of Electronics, Information and Communication Engineers (IEICE), IEICE, pp. 127-134, Vol. 84, No. 2, February, 2001, Japan.

PATENT DOCUMENTS

Patent Document 1

Japanese Unexamined Patent Application Publication No. 2004-7351.

DISCLOSURE OF THE INVENTION

Problems to be Solved by the Invention

It is desirable that a connection procedure required to access the ad-hoc network be easily done in consideration of users' convenience. At the same time, since the ad-hoc network is formed by a plurality of terminal apparatuses, a certain security measure must be taken in the light of influences on other terminal apparatuses. To improve the security, a role to approve the participation of a new terminal apparatus to the ad-hoc network is assigned to any one of the plurality of terminal apparatuses forming the ad-hoc network (hereinafter the terminal apparatus to which this role has been assigned is called "registrar"). Also, to improve the facility of connection procedure, the connection procedure is invoked and performed when a button provided in the registrar is pressed down and a button provided in the new terminal apparatus is pressed down within a predetermined length of time duration after the button of the registrar has been depressed.

When a terminal apparatus that has participated in the ad-hoc network actually starts to communicate, an IP address is assigned to the terminal apparatus. For example, the IP address is assigned thereto using DHCP (Dynamic Host Configuration Protocol) or Auto-IP. However, since a plurality of terminal apparatuses are participating in the ad-hoc network, which of those equipped with a DHCP server capability and those equipped with an Auto-IP capability are actually participating in the ad-hoc network may vary depending on the configuration of the ad-hoc network. Where those equipped with a DHCP server capability or those equipped with an Auto-IP capability are both participating, a certain compatibility among them is required.

The present invention has been made in view of the foregoing circumstances, and a purpose thereof is to provide a communication technology by which to assign IP addresses in accordance with the configuration of the ad-hoc network.

Means for Solving the Problems

In order to resolve the above problems, a terminal apparatus comprises: a communication unit configured to communicate with another terminal apparatus by forming an ad-hoc network with the another terminal apparatus; a receiving unit configured to receive a participation request from a new terminal apparatus via the communication unit, when the terminal apparatus is assigned a role to approve participation of the new terminal apparatus in the ad-hoc network formed in the communication unit; a first processing unit configured to approve the participation request received by the receiving unit; and a second processing unit configured to assign an IP address to the new terminal apparatus which has been approved by the first processing unit. When another terminal apparatus, to which an IP address is assignable, is contained in the ad-hoc network, the second processing unit instructs the new terminal apparatus to access the another terminal apparatus; when another terminal apparatus, to which an IP address is assignable, is not contained in the ad-hoc network and when the new terminal apparatus is capable of assigning an IP address on its own, the second processing unit instructs the new terminal apparatus to assign an IP address thereto; and when another terminal apparatus, to which an IP address is assignable, is not contained in the ad-hoc network and when the new terminal apparatus is not capable of assigning an IP address on its own, the second processing unit assigns an IP address to the new terminal apparatus.

Another embodiment of the present invention relates to a communication method. The method comprises: communicating with another terminal apparatus by forming an ad-hoc network with the another terminal apparatus; receiving a participation request from a new terminal apparatus, when a terminal apparatus is a role to approve participation of the new terminal apparatus to the ad-hoc network; approving the received participation request; and assigning an IP address to the new terminal apparatus which has been approved in said approving. When another terminal apparatus, to which an IP address is assignable, is contained in the ad-hoc network, the assigning an IP address instructs the new terminal apparatus to access the another terminal apparatus; when another terminal apparatus, to which an IP address is assignable, is not contained in the ad-hoc network and when the new terminal apparatus is capable of assigning an IP address on its own, the assigning an IP address instructs the new terminal apparatus to assign an IP address thereto; and when another terminal apparatus, to which an IP address is assignable, is not contained in the ad-hoc network and when the new terminal apparatus is not capable of assigning an IP address on its own, the assigning an IP address assigns an IP address to the new terminal apparatus.

Optional combinations of the aforementioned constituting elements, and implementations of the invention in the form of methods, apparatuses, systems, recording media, computer programs and so forth may also be practiced as additional modes of the present invention.

Effect of the Invention

The present invention automatically assigns IP address in accordance with an ad-hoc network structure.

BEST MODE FOR CARRYING OUT THE INVENTION

An outline of the present invention will be given before a specific description thereof. An exemplary embodiment of the present invention relates to a communication system that performs wireless communications in an ad-hoc network formed by a plurality of terminal apparatuses. In the ad-hoc network, any one of the plurality of terminal apparatuses is assigned as the above-described registrar. There is a new terminal apparatus that desires a connection to the ad-hoc network. The registrar approves the new terminal apparatus and assigns an IP address to the new terminal apparatus. The IP address is assigned using the DHCP server function or Auto-IP function, for instance. There may be cases where both a terminal apparatus equipped with the DHCP server capability and a terminal apparatus equipped with the Auto-IP capability are not contained within the ad-hoc network. Also, if a terminal apparatus constituting the ad-hoc network is equipped with the DHCP server capability, the compatibility with the DHCP server will be required. Thus, the communication system according to the exemplary embodiment of the present invention carries out the following processes.

A table indicating information on terminal apparatuses is transmitted by broadcast in the ad-hoc network. The table indicates (i) an IP address, (ii) whether the DHCP server function is incorporated or not, (iii) whether the Auto-IP function is incorporated or not, and the like for each terminal apparatus. Upon receipt of a connection request sent from a new terminal apparatus, the registrar performs approval processing on the new terminal apparatus. In so doing, the registrar also acquires information on the functions provided in the new terminal apparatus. After completing the approval processing, the registrar instructs the new terminal apparatus to access a terminal apparatus equipped with the DHCP server capability in the ad-hoc network (hereinafter referred to as "DHCP server") if a DHCP server is available within the ad-hoc network.

By accessing the DHCP server, the new terminal apparatus is assigned an IP address from the DHCP server. If, on the other hand, the DHCP server is not available within the ad-hoc network and if the new terminal apparatus is equipped with the Auto-IP capability, the registrar will instruct the new terminal apparatus to assign an IP address thereto using the Auto-IP function. If the DHCP server is not available within the ad-hoc network and if the new terminal apparatus does not have the Auto-IP function, the registrar will assign an IP address to the new terminal apparatus using a MAC layer scheme.

The communication system principally performs (1) a process of connecting the new terminal apparatus to the ad-hoc network (hereinafter referred to as "connection processing") and (2) a process of transferring data signals in the ad-hoc network (hereinafter referred to as "transfer processing"). It is to be noted here that the above-described approval processing and the IP address assignment processing are included in the connection processing (1).

Figure 1:
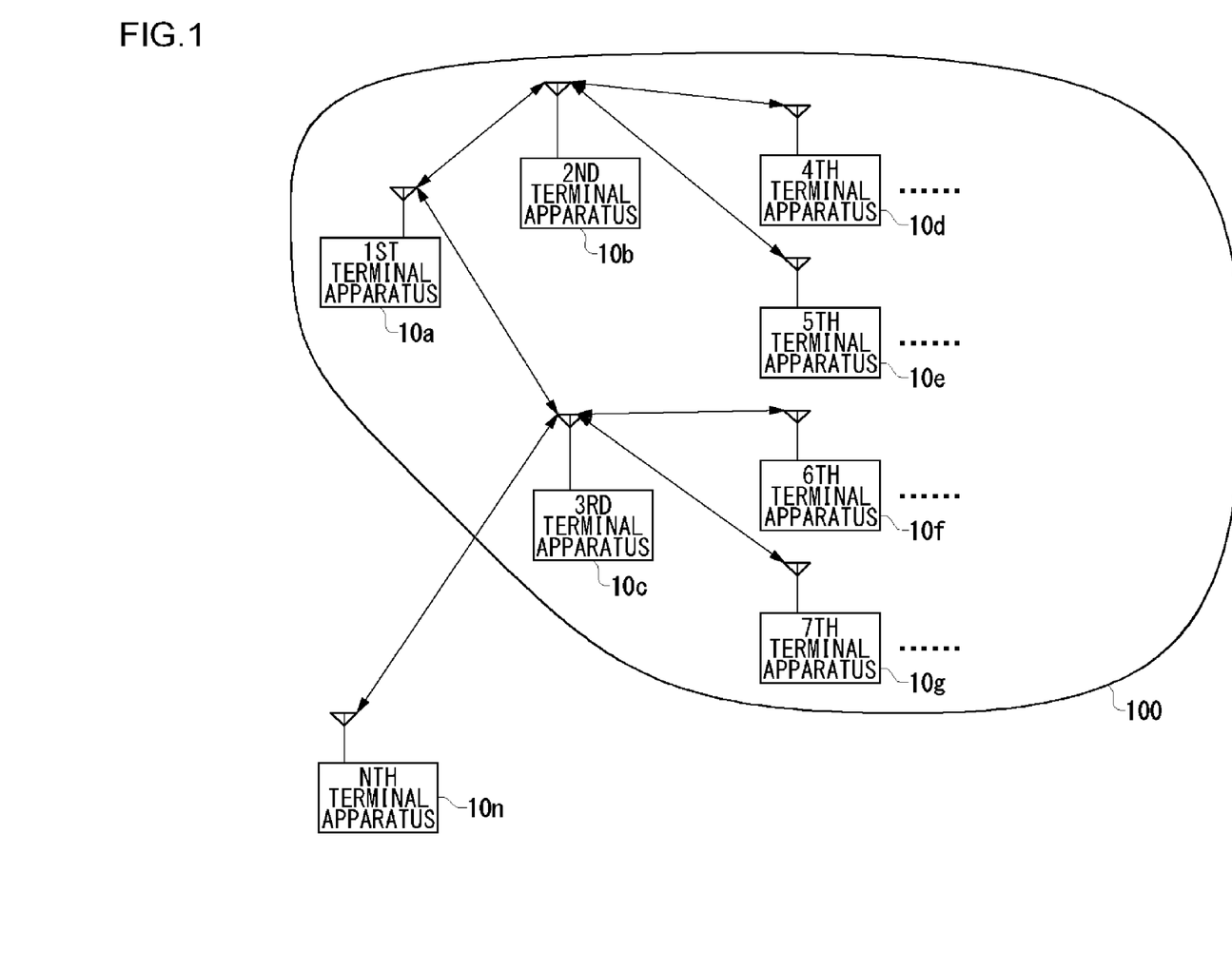
FIG. 1 illustrates a structure of a communication system according to an exemplary embodiment of the present invention.

FIG. 1 illustrates a structure of the communication system 100 according to the exemplary embodiment of the present invention. The communication system 100 includes a first terminal apparatus 10a, a second terminal apparatus 10b, a third terminal apparatus 10c, a fourth terminal apparatus 10d, a fifth terminal apparatus 10e, a sixth terminal apparatus 10f, and a seventh terminal apparatus, which are generally referred to as "terminal apparatus 10" or "terminal apparatuses 10". Also, an Nth terminal apparatus 10n is about to be included in the communication system 100.

A plurality of terminal apparatuses 10, which are the first terminal apparatus 10a to the seventh terminal apparatus 10g, for instance, communicate with each other by forming an ad-hoc network among them. Note that the terminal apparatuses 10 constituting the ad-hoc network are not limited to the first terminal apparatus 10a to the seventh terminal apparatus 10g. Also, a plurality of terminal apparatuses 10 are compatible with a wireless LAN system complying with IEEE 802.11 or the like. It suffices if the routing method in the ad-hoc network is compatible with any known art such as the above-described table-driven method, on-demand method and hybrid method. For example, where the table-driven method is used, the routing table is updated using the known art.

In addition to an ordinary communication function in the ad-hoc network, the role of approving the participation of a new terminal apparatus 10 to the ad-hoc network is assigned to the third terminal apparatus 10c, for instance. In other words, the third terminal apparatus 10c corresponds to the above-described registrar. Though the processing performed by the registrar will be discussed later, the registrar may be thought of as a terminal apparatus 10 that issues a certificate of eligibility for participation to the ad-hoc network or cancels it. Though the function of the registrar are provided in terminal apparatuses 10 other than the third terminal apparatus 10c, it is assumed herein that the function of the registrar provided in the other terminal apparatuses than the third terminal apparatus 10c is set inactive under the present circumstances. For the clarity of explanation, assume herein that only one registrar is included in the communication system 100. The new terminal apparatus 10, namely the Nth terminal apparatus 10n, requests a participation to the ad-hoc network formed by the plurality of terminal apparatuses 10. Thus, the Nth terminal apparatus 10n requests the registrar to grant the participation. If the participation is granted by the registrar, the Nth terminal apparatus 10n will become a new member that constitutes the communication system 100. In the following explanation, the Nth terminal apparatus 10n is sometimes called a "request side" and the registrar a "response side", for convenience.

Besides the above-described process for approving a new terminal apparatus 10, the registrar assigns an IP address to the new terminal apparatus 10. In such a case, there may be cases where a terminal apparatus 10 equipped with the DHCP server function (as described above, hereinafter referred to as "DHCP server" also) is included in the communication system 100 and/or there may be cases where the new terminal apparatus 10 is equipped with the Auto-IP function. For example, the second terminal apparatus 10b corresponds to the DHCP server. Or there may be cases where the DHCP server is not included in the communication system 100 and the new terminal apparatus 10 does not have the Auto-IP function. In other words, the procedure for assigning an IP address differs depending on the function of each of the terminal apparatuses forming the communication system 100. Even in such a case, it is required that an IP address be reliably assigned to the new terminal apparatus 10. If the DHCP server is included therein, the compatibility with the DHCP server will also be required.

Figure 2:
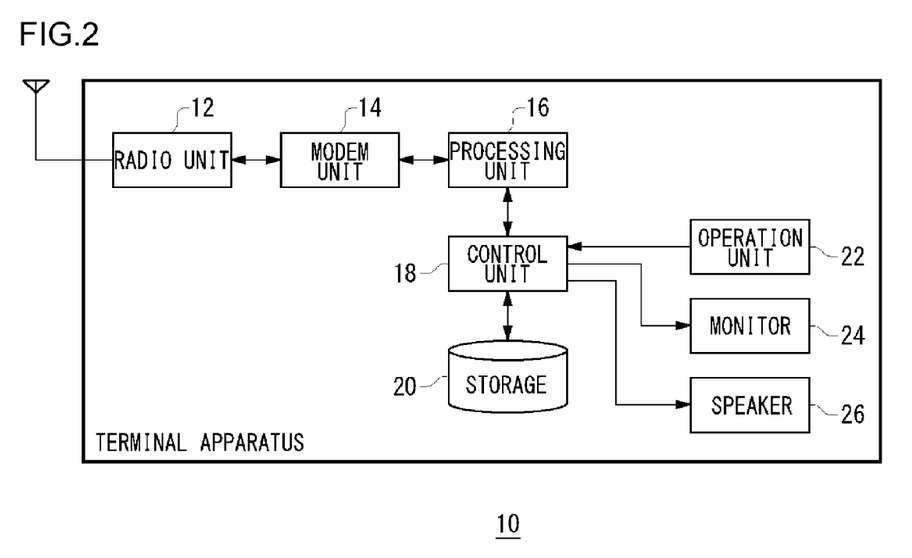
FIG. 2 illustrates a structure of a terminal apparatus of FIG. 1.

FIG. 2 illustrates a structure of a terminal apparatus 10. The terminal apparatus 10 includes a radio unit 12, a modem unit 14, a processing unit 16, a control unit 18, a storage 20, an operation unit 22, a monitor 24, and a speaker 26. Note that FIG. 1 shows a plurality of terminal apparatuses 10 which include a request-side terminal apparatus 10 and a response-side terminal apparatus 10, and each of the plurality terminal apparatuses 10 has the structure as shown in FIG. 2.

The radio unit 12 communicates with another terminal apparatus 10 by forming an ad-hoc network between the terminal apparatus itself 10 and the another terminal apparatus 10. As a receiving processing, the radio unit 12 carries out frequency conversion of radiofrequency signals received via an antenna so as to generate baseband signals. Then the radio unit 12 outputs the baseband signals to the modem unit 14. The baseband signal, which is composed of in-phase components and quadrature components, shall generally be transmitted by two signal lines. For the clarity of Figure, those are presented here by a single signal line. An LNA (Low Noise Amplifier), a mixer, an AGC unit and an A-D conversion unit are also included in the radio unit 12.

As a transmission processing, the radio unit 12 carries out frequency conversion of the baseband signals inputted from the modem unit 14 so as to generate radiofrequency signals. Further, the radio unit 12 transmits the radiofrequency signals from the antenna. A PA (Power Amplifier), a mixer and a D-A conversion unit are also included in the radio unit 12.

As a receiving processing, the modem unit 14 demodulates the baseband signals fed from the radio unit 12. Then the modem unit 14 outputs the demodulation result to the processing unit 16. As a transmission processing, the modem unit 14 modulates the signals sent from the processing unit 16. Then the modem unit 14 outputs the modulation result to the radio unit 12 as baseband signals. If the terminal apparatus 10 is compatible with the IEEE 802.11a or like standard which is based on the OFDM scheme, the modem unit 14 will also perform FFT (Fast Fourier Transform) as a receiving processing, and it will also perform IFFT (Inverse Fast Fourier Transform) as a transmission processing. If the terminal apparatus 10 is compatible with a spread spectrum scheme (e.g., IEEE 802.11b), the modem unit 14 will also perform inverse spreading as a receiving processing and also perform spreading as a transmission processing. Further, if the terminal apparatus 10 is compatible with a MIMO (Multiple-Input Multiple-Output) scheme (e.g., IEEE 802.11n), the modem unit 14 will also perform adaptive array signal processing as a receiving processing and also distribute data streams to multiple streams as a transmission processing.

The processing unit 16 performs digital signal processing on the signals fed to and from the modem unit 14. Examples of the digital signal processing are the coding of error correction as a transmission processing and the decoding of error correction as a receiving processing. Note that the digital signal processing is not limited thereto. The processing unit 16 outputs the result of digital signal processing performed on the signals fed from the modem unit 14, to the control unit 18, and receives an input of signals to be sent to the modem unit 14, from the control unit 18.

The control unit 18 controls the entire operation of the terminal apparatus 10. The processing performed by the control unit 18 is mainly divided into (1) the above-described connection processing, (2) the above-described transfer processing, and (3) an input/output processing of data. For convenience of explanation, (3) is hereunder explained first, then followed by (1) and (2). As an output processing, the control unit 18 receives the result of the digital signal processing from the processing unit 16, and outputs it to the monitor 24 and the speaker 26. Also, as an input processing, the control unit 18 receives an instruction signal from the operation unit 22, and outputs data according to the instruction signal, to the processing unit 16. The operation unit 22 is provided with buttons and the like. If the terminal apparatus 10 is so configured as to be connected to a personal computer, the operation unit 22 may be a keyboard or a mouse provided in the personal computer.

A description is now given of (1) the connection processing. The connection processing is carried out between the request-side terminal apparatus 10 and the response-side terminal apparatus 10. A description is given hereunder of processing carried out by a control unit 18 in the request-side terminal apparatus 10 and then followed by a description of processing carried out by a control unit 18 in the response-side terminal apparatus 10. Note that the request-side terminal apparatus 10 corresponds to the Nth terminal apparatus 10n of FIG. 1, and the response-side terminal apparatus 10 corresponds to the third terminal apparatus 10c of FIG. 1.

When the control unit 18 in the request-side terminal apparatus 10 detects that a button in the operation unit 22 is pressed down by a user, the request-side terminal apparatus 10 starts operating in a request mode. As the terminal apparatus 10 starts operating in the request mode, the control unit 18 controls the processing unit 16, the modem unit 14 and the radio unit 12 so that a packet indicating the request for participation in the ad-hoc network (hereinafter referred to as "request signal") shall be transmitted to the registrar. At that time, together with or separate from the request signal, the control unit 18 has the processing unit 16, the modem unit 14 and the radio unit 12 transmit information, indicating a list of functions executable by the terminal apparatus 10 (this information will be hereinafter referred to as "capability information") as well. Note that the capability information may be exchanged among the plurality of terminal apparatuses 10 forming the communication system 100.

Note also that the capability information contains information on whether the terminal apparatus 10 is a DCHP server or not, and information on whether the terminal apparatus 10 has an Auto-IP function or not, for instance. Then, the processing unit 16, the modem unit 14 and the radio unit 12 each receives the packet signal indicating that the participation has been granted (hereinafter referred to as "permission (enabling) signal") from the registrar that has transmitted the request signal. The permission signal is inputted to the control unit 18. Following this, the control unit 18 assigns an IP address as necessary. This IP address assignment processing will be explained in a process carried out by the response-side terminal apparatus 10. Then the control unit 18 operates in a communication mode. When the terminal apparatus 10 starts operating in the communication mode, the control unit 18 controls the radio unit 12, the modem unit 14 and the processing unit 16 so that they shall perform communications by participating in the ad-hoc network.

The control unit 18 in the terminal apparatus 10 participating in the communication system 100 exchanges, via the radio unit to the processing unit 16, a table containing the address of each terminal apparatus 10 and the like with other terminal apparatuses 10. Such a table is updated whenever a new terminal apparatus 10 participates in the communication system 100 or the new terminal apparatus 10 has withdrawn from the communication system 100. The control unit 18 stores the thus exchanged table in the storage 20. Exchanging the table with the terminal apparatuses 10 allows the terminal apparatuses 10 participating the communication system 100 to share information on the addresses and the like.

Figure 3:
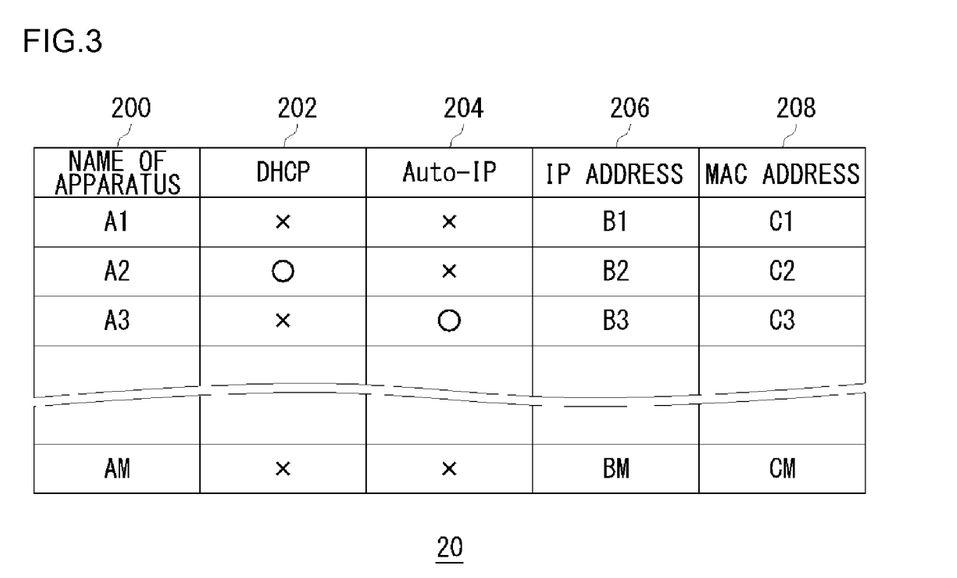
FIG. 3 illustrates a data structure of a table for addresses stored in a storage of FIG. 2.

The table is exchanged in a MAC layer. FIG. 3 illustrates a data structure of the table for addresses stored in the storage 20. The table contains a terminal apparatus name column 200, a DHCP column 202, an Auto-IP column 204, an IP address column 206, and a MAC address column 208. Names used to identify the terminal apparatuses 10 are indicated in the terminal apparatus name column 200. The DHCP column 202 and the Auto-IP column 204 are appended based on the above-described capability information. The IP address column 206 and the MAC address column 208 indicate an IP address and a MAC address corresponding to each terminal apparatus 10, respectively. Now, refer back to FIG. 2.

When the control unit 18 in the response-side terminal apparatus 10 detects that a button in the operation unit 22 is pressed down by a user, the response-side terminal apparatus 10 starts operating in an approval mode. The approval mode is a state where the approval processing is executable. As the terminal apparatus 10 starts operating in the approval mode, the control unit 18 receives the request signal sent from the request-side terminal apparatus 10 over a predetermined length of time via the radio unit 12, the modem unit 14 and the processing unit 16. The control unit 18 performs approval processing on the received request signal. Here, a known art may be used for the approval processing. For example, the control unit 18 exchanges a public key with the request-side terminal apparatus 10 via the radio unit 12, the modem unit 14 and the processing unit 16, and then performs authentication processing and identification processing on the request-side terminal apparatus 10.

It is only necessary here that a "device password" is used in the authentication processing. Also, the control unit 18 receives the capability information sent from the request-side terminal apparatus, via the radio unit 12, the modem unit 14 and the processing unit 16. If the participation is permitted, the control unit 18 will transmit the permission signal to the request-side terminal apparatus 10 via the processing unit 16, the modem unit 14 and the radio unit 12. If, on the other hand, the participation is denied, the control unit 18 will transmit a denial signal to the request-side terminal apparatus 10 via the processing unit 16, the modem unit 14 and the radio unit 12.

The control unit 18 performs the IP address assignment processing on the request-side terminal apparatus 10 which has undergone the approval processing. The control unit 18 references the table for addresses stored in the storage 20 and thereby checks to see if a DHCP server, namely a server capable of assigning an IP address, is included in the ad-hoc network. If the DHCP server is included in the ad-hoc network, the control unit 18 will convey the IP address of the DHCP server to the request-side terminal apparatus 10 via the processing unit 16, the modem unit 14 and the radio unit 12 so as to instruct the request-side terminal apparatus 10 to access the DHCP server. For example, if the second terminal apparatus 10b is the DHCP server, the control unit 18 will convey the IP address of the second terminal apparatus 10b. As the control unit 18 in the request-side terminal apparatus 10 receives the permission signal and then receives the IP address of the DHCP server, the control unit 18 in the request-side terminal apparatus 10 accesses the DHCP server based on said IP address.

A known art may be used for a process of setting IP addresses between the request-side terminal apparatus 10 and the DHCP server. Such a known art is briefly explained here. The control unit 18 sends a configuration setting request and waits for a response from the DHCP server. As the control unit 18 receives DHCP information as the response, the control unit 18 starts to send a configuration and waits for ACK from the DHCP server. As the control unit 18 receives ACK from the DHCP server, the process of setting IP addresses is completed. Then the request-side terminal apparatus 10 or the DHCP server reports the thus set IP address to the response-side terminal apparatus 10. The control unit 18 in the response-side terminal apparatus 10 updates the table according to the report. Note that the table may be updated by the DHCP server.

If, on the other hand, it is found that the DHCP is not included in the ad-hoc network after the table for addresses stored in the storage 20 has been referenced, the control unit 18 will check to see if the request-side terminal apparatus 10 has an Auto-IP function, namely check to see if the request-side terminal apparatus 10 is capable of assigning an IP address by itself. Whether the request-side terminal apparatus 10 has an Auto-IP function or not is checked based on the capability information sent from the request-side terminal apparatus 10. If the request-side terminal apparatus 10 has the Auto-IP function, the control unit 18 will instruct the request-side terminal apparatus 10 to assign an IP address thereto using the Auto-IP function. A known art may be used for the Auto-IP function.

A brief description is now given. The control unit 18 selects an IP address from within a range of local addresses by generating a random number, and transmits, by broadcast, an ARP (Address Resolution Phase) request for the selected IP address. If there is a response to the ARP request, this means that said IP address is already used in the communication system 100. Thus, the control unit 18 selects another IP address and transmits again the ARP request by broadcast. The above process continues until there is no more response to the ARP request. As a result, the control unit 18 sets an IP address which is determined to be unused. Then, the request-side terminal apparatus 10 reports the thus set IP address to the response-side terminal apparatus 10. The control unit 18 in the response-side terminal apparatus 10 updates the table according to this report.

If, on the other hand, checking the capability information shows that the request-side terminal apparatus 10 does not have the Auto-IP function, the control unit 18 will assign an IP address to the request-side terminal apparatus 10 using the MAC layer scheme. More specifically, the control unit 18 searches for unused IP addresses by referencing the table for addresses stored in the storage 20 and then selects an unused IP address as the IP address of the request-side terminal apparatus 10. Also, the control unit 18 updates the table for addresses so that the combination of the selected IP address and the MAC address of the request-side terminal apparatus 10 can be added. The control unit 18 transmits, by broadcast, the updated table for addresses. The control unit 18 in the request-side terminal apparatus 10 receives the table for addresses and extracts an IP address corresponding to its own MAC address. Further, the control unit 18 sets the extracted IP address.

After a certain length of time elapses after the completion of the above-described processing or after a certain length of time elapses after the start of a request mode, the control unit 18 in the request-side terminal apparatus 10 operates in a communication mode. When the terminal apparatus 10 starts operating in the communication mode, the control unit 18 controls the radio unit 12, the modem unit 14 and the processing unit 16 so that they shall perform communications by participating in the ad-hoc network.

The transfer processing (2) is now described. A routing table is generated for the transfer processing. A known art may be used for the generation of the routing table. The control unit 18 stores the thus generated routing table in the storage 20. In the transfer processing, the control unit 18 acquires the destination address of the packet signal received via the radio unit 12, the modem unit 14 and the processing unit 16. Also, the control unit 18 identifies a hop destination address corresponding to the acquired destination address by referencing the routing table stored in the storage 20. Further, the control unit 18 transmits the packet signal to the identified hop destination address via the processing unit 16 to the radio unit 12.

As described above, at a stage of the transfer processing too, the table for addresses is transmitted by broadcast whenever the table for addresses is updated. For example, if a predetermined terminal apparatus 10 detects that another terminal apparatus 10 has withdrawn from the communication system 100, the tables for addresses is updated so that the information concerning the another terminal apparatus shall be removed. Note that the withdrawal of the another terminal apparatus is detected if no response is received for a predetermined duration of time. The predetermined terminal apparatus 10 transmits, by broadcast, the thus updated table for addresses.

This structure may be implemented hardwarewise by a CPU, memory and other LSIs of an arbitrary computer, and softwarewise by memory-loaded programs having a communication function therein. Depicted herein are functional blocks implemented by cooperation of these. Therefore, it is understood by those skilled in the art that the functional blocks may be implemented by a variety of manners including hardware only, software only or a combination of both.

Figure 4:
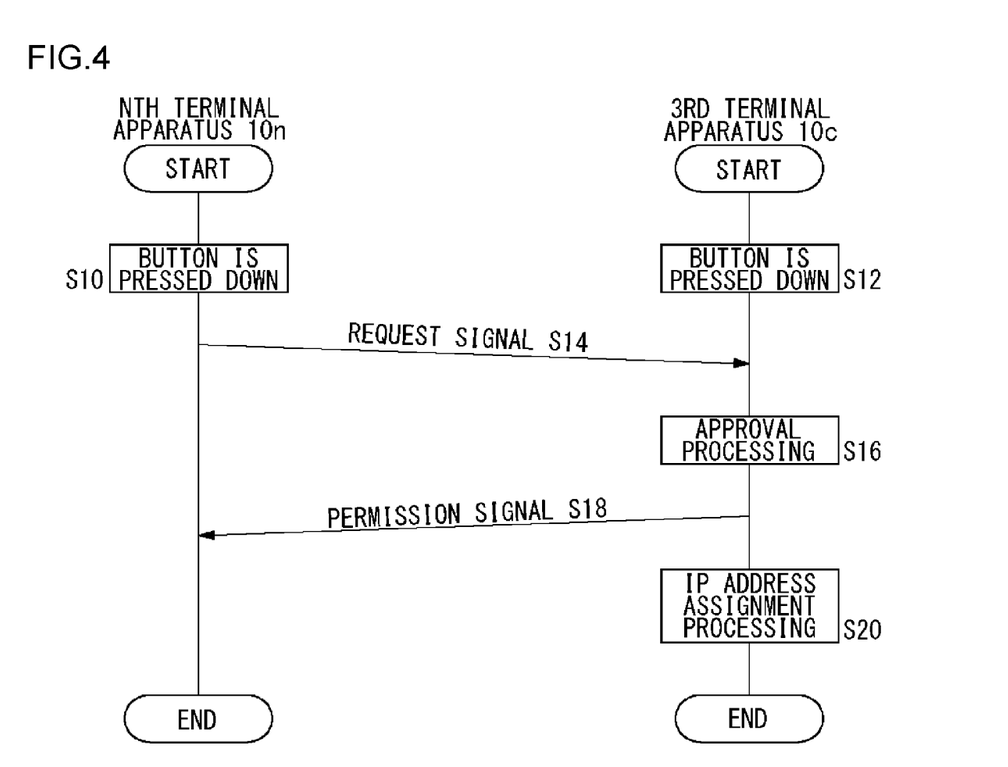
FIG. 4 is a sequence diagram showing a connection procedure in the communication system of FIG. 1.

An operation of the communication system 100 structured as above is now described. FIG. 4 is a sequence diagram showing a connection procedure in the communication system 100. The button of the Nth terminal apparatus 10n is pressed down (S10), and the button of the third terminal apparatus 10c is also pressed down (S12). The Nth terminal apparatus 10n transmits a request signal to the third terminal apparatus 10c (S14). The third terminal apparatus 10c performs the approval processing on the Nth terminal apparatus 10n (S16). The third terminal apparatus 10c transmits a permission signal to the Nth terminal apparatus 10n (S18). Also, the third terminal apparatus 10c performs the IP address assignment processing (S20).

Figure 5:
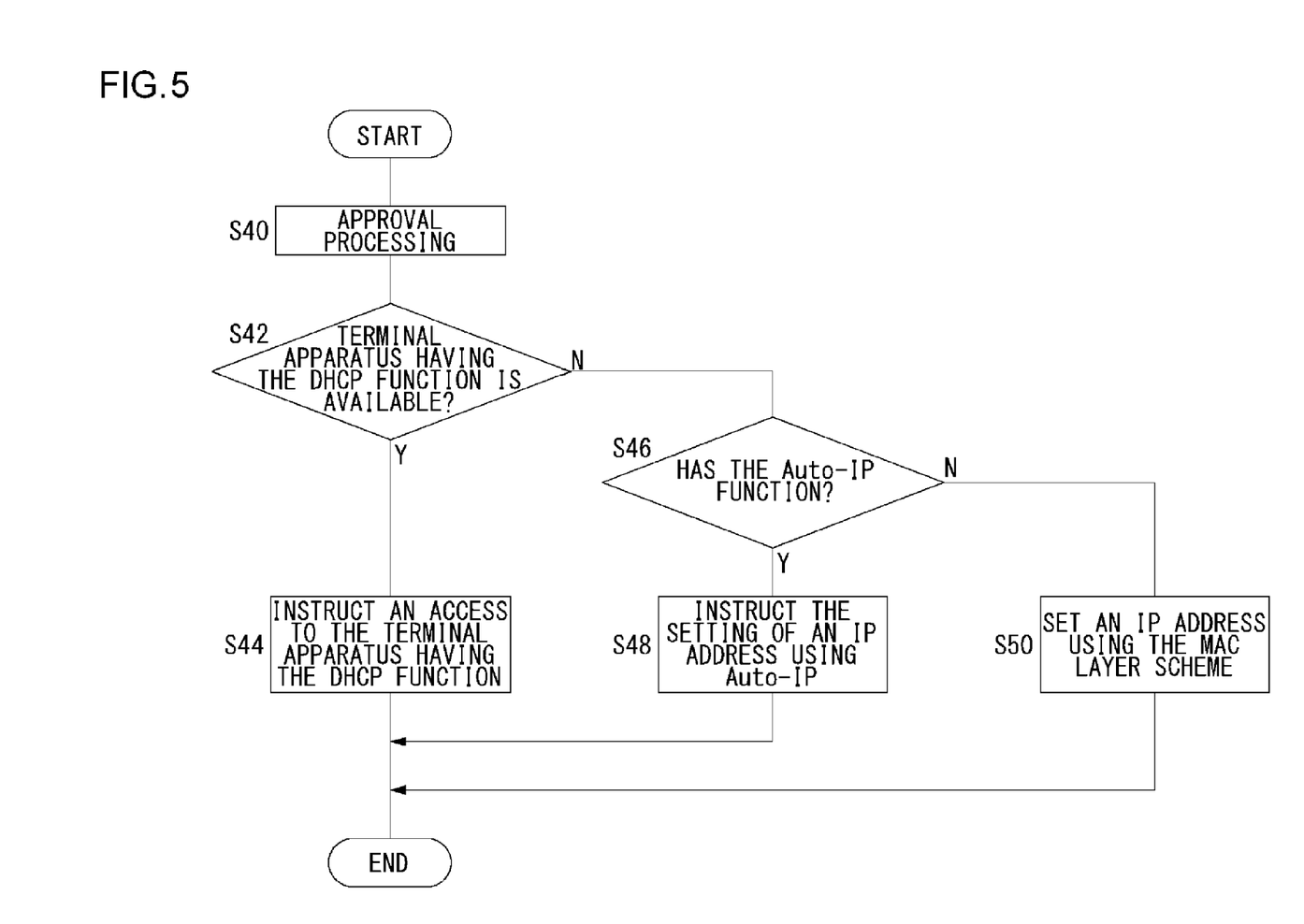
FIG. 5 is a flowchart showing a connection procedure in the terminal apparatus of FIG. 2.

FIG. 5 is a flowchart showing the connection procedure in the terminal apparatus 10. The control unit 18 performs the approval processing (S40). If a terminal apparatus 10 having the DHCP function is available (Y of S42), the control unit 18 will instruct an access to the terminal apparatus 10 having the DHCP function (S44). If, on the other hand, the terminal apparatus 10 having the DHCP function is not available at all (N of S42) and a new terminal apparatus 10 has the Auto-IP function (Y of S46), the control unit 18 will instruct the setting of an IP address using Auto-IP (S48). If the new terminal apparatus 10 does not have the Auto-IP function (N of S46), the control unit 18 will set an IP address using the MAC layer scheme (S50).

Figure 6:
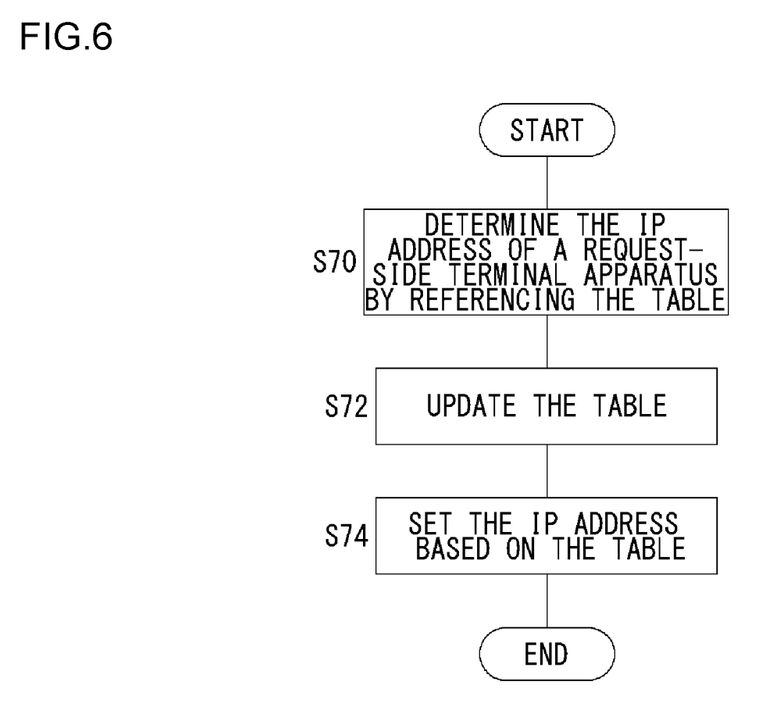
FIG. 6 is a flowchart showing a procedure for setting an IP address, using a MAC layer scheme, in the terminal apparatus of FIG. 2.

FIG. 6 is a flowchart showing a procedure for setting an IP address, using the MAC layer scheme, in the terminal apparatus 10. This procedure corresponds to Step S50 of FIG. 5. The control unit 18 determines the IP address of the request-side terminal apparatus 10 by referencing the table stored in the storage 20 (S70). The control unit 18 updates the table stored in the storage 20 (S72). The control unit 18 sets the IP address to the request-side terminal apparatus 10, based on the table (S74).

A modification is now described. Similarly to the exemplary embodiment, the modification relates to the terminal apparatuses 10. A response-side terminal apparatus 10 according to the modification determines a method for assigning an IP address based on the number of terminal apparatuses that form the ad-hoc network, if no DHCP server is included in the ad-hoc network and a request-side terminal apparatus 10 does not have the Auto-IP function. The control unit 18 in the response-side terminal apparatus 10 references the table for addresses stored in the storage 20 and thereby acquires the number of terminal apparatuses 10 included in the communication system 100. If the number of terminal apparatuses 10 is larger than a threshold value, the control unit 18 will perform the above-described MAC layer scheme. If, on the other hand, the number of the terminal apparatuses 10 is less than or equal to the threshold value, the control unit 18 will have the request-side terminal apparatus 10 determine an IP address based on the MAC address of the request-side terminal apparatus 10. A known technique may be used for the determination of such an IP address and therefore the repeated description thereof is omitted here.

By employing the exemplary embodiment of the present invention, the means for assigning an IP address is switched according to whether the DHCP server function is available or not and whether the Auto-IP function is available or not. Also, where the DHCP server is available and/or the Auto-IP function is available, they are used preferentially and therefore the compatibility with them can be maintained. Also, where the DHCP server is available, it is used preferentially and therefore an IP address can be assigned without fail. Also, even when the configuration of the ad-hoc network is changed, an IP address can be assigned to the new terminal apparatus. Also, even in a case where neither the DHCP server function nor the Auto-IP function is available, the registrar assigns an IP address, allowing the new terminal apparatus to communication with the other existing terminal apparatuses in the ad-hoc network.

The present invention has been described based on the exemplary embodiment. This exemplary embodiment is intended to be illustrative only, and it is understood by those skilled in the art that various modifications to constituting elements and processes as well as arbitrary combinations thereof could be further developed and that such modifications and combinations are also within the scope of the present invention.

In the exemplary embodiment of the present invention, the terminal apparatus 10 performs the connection processing and the transfer processing, using the same radio unit 12 and the same modem unit 14. In other words, both the connection processing and the transfer processing are performed using a wireless LAN. However, this should not be considered as limiting and, for example, another radio unit 12 and another modem unit 14 may be used for the connection processing and the transfer processing. In other words, though the wireless LAN is used for the transfer processing, another communication system may be used for the connection processing. Also, they may be reversed. According to this modification, the degree of freedom in the configuration of the communication system 100 can be improved.

In the exemplary embodiment of the present invention, the DHCP server performs DHCP to assign an IP address to the new terminal apparatus 10. However, this should not considered as limiting and, for example, the server may perform RARP (Reverse Address Resolution Protocol) or BOOTP (Bootstrap Protocol). By employing this modification, various kinds of protocols can be used.

In the exemplary embodiment of the present invention, multi-hop communications are executed among a plurality of terminal apparatuses 10 in the communication system 100. However, this should not be considered as limiting and, for example, direct communications only may be executed between any of two terminal apparatuses 10. According to this modification, the degree of freedom in the configuration of the communication system 100 can be improved.

DESCRIPTION OF THE REFERENCE NUMERALS

10 Terminal apparatus
12 Radio unit
14 Modem unit
16 Processing unit
18 Control unit
20 Storage
22 Operation Unit
24 Monitor
26 Speaker
100 Communication unit

INDUSTRIAL APPLICABILITY

The present invention assigns IP addresses in accordance with an ad-hoc network structure.

What is claimed is:

1. A terminal apparatus configured to form an ad-hoc network with another terminal apparatus; the terminal apparatus comprising:
    a receiving unit configured to receive a participation request from a new terminal apparatus; and
    a processing unit configured to:
    (1) instruct the new terminal apparatus to access the another terminal apparatus when the participation request is approved and the another terminal apparatus, which is capable of assigning an IP address to the new terminal apparatus, is in the ad-hoc network;
    (2) instruct the new terminal apparatus to assign itself an IP address when the participation request is approved, the another terminal apparatus, which is capable of assigning an IP address to the new terminal apparatus, is not in the ad-hoc network, and the new terminal apparatus is capable of assigning itself an IP address; and
    (3) assign an IP address to the new terminal apparatus when the participation request is approved, the another terminal apparatus, which is capable of assigning an IP address to the new terminal apparatus, is not in the ad-hoc network, and the new terminal apparatus is not capable of assigning itself an IP address.

2. A terminal apparatus according to claim 1, wherein when the another terminal apparatus, which is capable of assigning an IP address to the new terminal apparatus, is not in the ad-hoc network, the new terminal apparatus is not capable of assigning itself an IP address, and when the number of terminal apparatuses forming the ad-hoc network is larger than a threshold value, the processing unit determines an IP address based on a MAC address of the new terminal apparatus.

3. A communication method forming an ad-hoc network with another terminal apparatus; the communication method comprising: receiving a participation request from a new terminal apparatus; and
    (1) instructing, by a processor, the new terminal apparatus to access the another terminal apparatus when the participation request is approved and the another terminal apparatus, which is capable of assigning an IP address to the new terminal apparatus, is in the ad-hoc network;
    (2) instructing, by the processor, the new terminal apparatus to assign itself an IP address when the participation request is approved, the another terminal apparatus, which is capable of assigning an IP address to the new terminal apparatus, is not in the ad-hoc network, and the new terminal apparatus is capable of assigning itself an IP address; and (3) assigning, by the processor, an IP address to the new terminal apparatus when the participation request is approved, the another terminal apparatus, which is capable of assigning an IP address to the new terminal apparatus, is not in the ad-hoc network and the new terminal apparatus is not capable of assigning itself an IP address.

* * * * *

UNITED STATES PATENT AND TRADEMARK OFFICE
CERTIFICATE OF CORRECTION

PATENT NO.       : 8,452,895 B2
APPLICATION NO.  : 13/120133
DATED            : May 28, 2013
INVENTOR(S)      : Kiyoshige Ito Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 268 days.

Signed and Sealed this
Eighth Day of September, 2015

Michelle K. Lee
*Director of the United States Patent and Trademark Office*